US011947329B2

(12) United States Patent
Wuerr et al.

(10) Patent No.: US 11,947,329 B2
(45) Date of Patent: Apr. 2, 2024

(54) EXECUTION ENVIRONMENT FOR RUNNING AN EVENT-ORIENTED CONTROL PROGRAM

(71) Applicant: Schneider Electric Industries SAS, Rueil-Malmaison (FR)

(72) Inventors: Marcus Wuerr, Erlenbach (DE); Sebastian Diehm, Wertheim (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 13 days.

(21) Appl. No.: 17/643,620

(22) Filed: Dec. 10, 2021

(65) Prior Publication Data
US 2022/0187781 A1 Jun. 16, 2022

(30) Foreign Application Priority Data
Dec. 10, 2020 (EP) .................................... 20306537

(51) Int. Cl.
*G05B 19/05* (2006.01)
(52) U.S. Cl.
CPC .. *G05B 19/058* (2013.01); *G05B 2219/14006* (2013.01); *G05B 2219/15072* (2013.01)
(58) Field of Classification Search
USPC ......................................................... 700/19
See application file for complete search history.

(56) References Cited

U.S. PATENT DOCUMENTS

| 2016/0033962 | A1* | 2/2016 | Cote ................ G05B 19/41885 |
| | | | 700/29 |
| 2017/0249459 | A1* | 8/2017 | Permeh .................. G06N 20/00 |
| 2019/0146451 | A1* | 5/2019 | Bhatt ..................... G05B 19/19 |
| | | | 700/186 |
| 2021/0205995 | A1* | 7/2021 | Vu .......................... B25J 9/1666 |
| 2021/0373520 | A1* | 12/2021 | Frazer .................... G06F 11/07 |

OTHER PUBLICATIONS

Extended European Search Report dated May 17, 2021 in European Patent Application No. 20306537.0 (with English translation of Category of Cited Documents), 9 pages.
(Continued)

*Primary Examiner* — Md Azad
(74) *Attorney, Agent, or Firm* — Oblon, McClelland, Maier & Neustadt, L.L.P.

(57) ABSTRACT

An execution environment for executing an event-oriented control program of a programmable logic controller, wherein the control program comprises a plurality of functional modules to be successively executed, is configured to execute the functional modules in an event-controlled manner on the occurrence of activation events that are each associated with the individual functional modules. In this respect, the individual activation events of the functional modules to be successively executed form an event chain. The execution environment comprises a monitoring module for monitoring an execution duration of the functional modules of the event chain, wherein the monitoring module is configured to check the execution duration for an exceeding of a predefined time duration.

20 Claims, 11 Drawing Sheets

(56) References Cited

OTHER PUBLICATIONS

Figure 1:
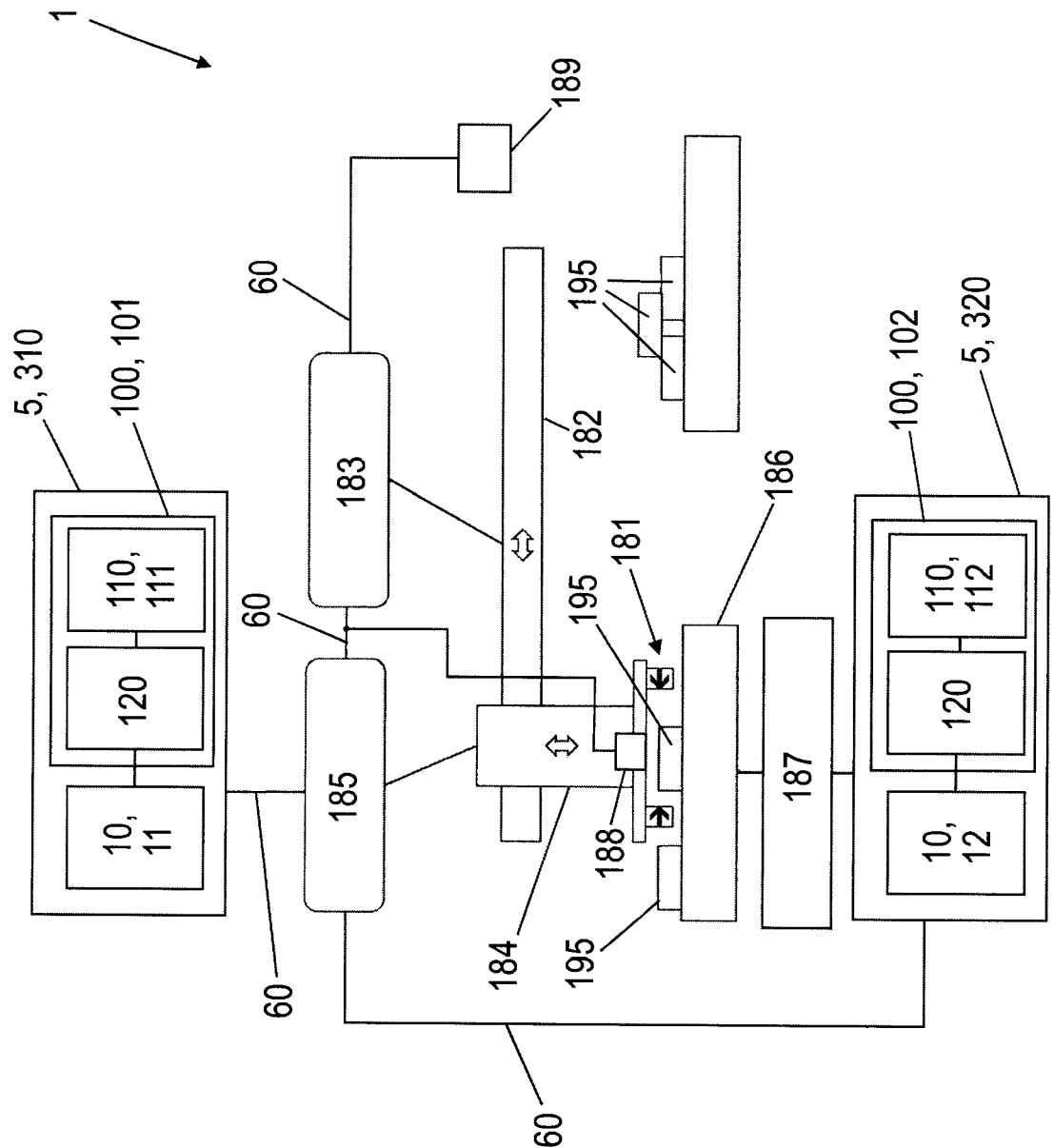

Wenbin Dai, et al., "Discrete-Event-Based Deterministic Execution Semantics With Timestamps for Industrial Cyber-Physical Systems," IEEE Transactions on Systems, Man, and Cybernetics: Systems, vol. 50, No. 3, XP011773154, Mar. 2020, pp. 851-862.

Thomas Strasser, et al., "Design and Execution Issues in IEC 61499 Distributed Automation and Control Systems," IEEE Transactions on Systems, Man, and Cybernetics—Part C: Applications and Reviews, 2010, 12 pages.

Rene Smodic, et al., "A Real-Time Execution Model for IEC 61 499 Based Control Applications," INCOM'2006: $12^{th}$ IFAC/IFIP/IFORS/IEEE/IMS Symposium, May 2006, pp. 541-546.

* cited by examiner

EXECUTION ENVIRONMENT FOR RUNNING AN EVENT-ORIENTED CONTROL PROGRAM

The present invention relates to an execution environment for executing an event-oriented control program of a programmable logic controller and to a method of executing an event-oriented control program of a programmable logic controller.

Programmable logic controllers are used in automation technology, among other things, to control automated processes and machine sequences. For this purpose, the programmable logic controllers are usually connected to sensors that detect a state of the automated process and that transmit sensor signals representing the state of the process to the controller. The controller then generates output signals for controlling actuators on the basis of a logical link of the read-in sensor signals, wherein the actuators influence the state of the automated process on the basis of the output signals. Sensors can, for example, be position encoders, rotary encoders, switches, light barriers or similar, whereas actuators can, for example, be drives, relays, or contactors.

The logical links for processing the read-in sensor signals and for generating the output signals are usually components of a control program of the programmable logic controller that is stored in a memory module of the controller. To execute the control program, programmable logic controllers typically comprise an execution environment that executes the control commands of the control program in a predefined sequence. In addition, the execution environment can manage the working memory required for the execution of the control commands and/or can coordinate the reading in of the sensor signals and the output of the output signals.

To ensure a reliable control of automated processes, the execution environment typically has to be configured to provide the output signals within predefined response times after the reading in of the sensor signals. Such systems are also designated as real-time capable control systems. In this respect, the execution environment has to ensure that the predefined response times are maintained irrespectively of the utilization of the system and the design of the control program, for example, irrespectively of possible programming errors. In the event of an exceeding of the response times, the execution environment can initiate suitable error responses. A provision of output signals within predefined response times can, for example, also be a requirement for a safety-related control of automated processes.

Real-time capable control systems are typically implemented by means of cyclic execution environments. In such execution environments, fixed time windows are defined for the reading in of the sensor signals, the computing of the output signals, and the output of the output signals within each cycle, wherein the individual time windows repeat periodically in order over a plurality of cycles. The time windows then also define the maximum response times of the control system. In a cyclic control system, it is therefore sufficient for the monitoring of the response times to check at the end of each processing cycle whether all the required output data are available or not.

In addition to cyclic control programs and execution environments, event-controlled control programs, such as are defined in the IEC 61499 standard, are also used in automation technology. Such control programs comprise a plurality of function blocks, wherein the reading in of the sensor signals, the logical linking of the read-in sensor signals, or the output of the output signals is in each case implemented by combinations of individual function blocks and an additional user-defined program text (code). The execution of the function blocks in this respect takes place in an event-controlled manner on the occurrence of activation events that are each associated with the individual function blocks, wherein the activation events of function blocks to be subsequently executed are generated on the execution of preceding function blocks.

Event-controlled execution models are inter alia suitable for distributed control systems; however, due to the lack of predefined processing cycles, they provide no possibility of ensuring the observance of predefined response times during the execution time. To reduce the likelihood of response timeouts, the computing capacity of event-controlled controllers is usually far oversized, for example, by 50%. The likelihood is thus reduced that sufficient computing capacity for a timely execution of the function blocks is no longer available in the case of a high utilization, wherein an observance of predefined execution times can, however, nevertheless not be ensured.

It is an object of the invention to provide an execution environment for executing an event-oriented control program and a method of executing an event-oriented control program with an improved real-time capability.

This object is satisfied by an execution environment for executing an event-oriented control program and a method of executing an event-oriented control program in accordance with the independent claims. Further developments are respectively set forth in the dependent claims.

An execution environment for executing an event-oriented control program of a programmable logic controller is set forth, wherein the control program comprises a plurality of functional modules to be successively executed. In this respect, the execution environment is configured to execute the functional modules in an event-controlled manner on the occurrence of activation events that are each associated with the individual functional modules, wherein the individual activation events of the functional modules to be successively executed form an event chain.

The execution environment comprises a monitoring module for monitoring an execution duration of the functional modules of the event chain, wherein the monitoring module is configured to check the execution duration for an exceeding of a predefined time duration.

It has been recognized within the framework of the invention that an observation of predefined execution durations can also be made possible in an event-oriented control program in that event chains of functional modules to be successively executed are in each case formed and the time required for the execution of the individual event chains is monitored. On an exceeding of the predefined time duration, a predefined response can then take place, for example, the execution of the control program can be stopped and/or the exceeding response can be triggered, for example a controlled machine can be transferred to a safe state. This in particular makes it possible to also use event-oriented control programs for implementing real-time applications in which a response to a sensor signal received by the controller has to take place within the predefined time duration.

The functional modules of the control program can each comprise at least one logical link, wherein an execution of the logical links of the individual functional modules is in each case triggered by the activation events associated with the individual functional modules. The logical links of the individual functional modules can, for example, be a respective component of an algorithm of the respective functional module. The functional modules of the control program to be successively executed can each be configured to generate activation events on their execution, said activation events triggering the execution of the respective functional module of the event chain to be executed directly afterwards. In this respect, the functional modules of the event chain are, for example, connected to one another via event links in that the activation event of each subsequent functional module is generated on the execution of a functional module executed directly beforehand. In this respect, the event links can each define the relationship of the activation events between the individual functional modules. The control program can, for example, satisfy the specifications of the IEC 61499 standard and the functional modules can, for example, be function blocks defined in this standard.

In general, the event chains can each comprise all the activation events that are generated on the basis of a predefined initial event to trigger the execution of the functional modules to be executed in order up to an end module to be executed as the last functional module of the event chain. The initial event can, for example, be an external activation event that is provided on an activation of an external input interface of the execution environment. The external input interface can, for example, be an interface to an execution resource of the control unit executing the execution environment. The external input interface can in particular be an external interface, for instance a sensor input, of a device executing the control program.

The initial event can, for example, be provided on the basis of a sensor signal received by the control unit, for example, on a reception of the sensor signal by the control unit or on a status change of the sensor signal received by the control unit. An initial module activated by the initial event as the first functional module can, for example, be a service interface function block in accordance with IEC 61499 configured as a responder function block.

The end module is defined by the last functional module of the event chain after whose execution no more activation signals are generated for the execution of further functional modules of the control program. The end module can, for example, be a functional module that is configured to output an output signal for an actuator via an external output interface of the execution environment. The end module can, for example, be a service interface function block in accordance with IEC 61499 configured as a requester function block. The end module can also be a functional module that is configured, on its execution, to change an internal status of the controller or to store a data value for further use, for example, for further use during the execution of the control program.

The predefined time duration can, for example, define a response time of the controller with respect to an input signal. The input signal can, for example, trigger the activation of the initial module of the event chain. The event chain can, for example, comprise all the activation events which, triggered by a reception of a sensor signal via the input interface, are generated in order until an end module executed on the basis of the sensor signal has been executed and, for instance, an output signal generated on the basis of the sensor signal is output via the output interface, or a status is changed on the basis of the sensor signal, or a data value generated on the basis of the sensor signal is stored.

The checking of the execution durations for the exceeding of the predefined time duration takes place at the execution time of the control program and/or at the execution time of the individual functional modules of the event chain. The monitoring module can be formed separately from an execution module of the execution environment executing the individual functional modules of the event chain. Such an execution module can, for example, comprise a scheduler. The execution module can, for example, manage event queues in which activation events still to be executed are stored. The execution environment or the execution module can, for example, be configured to process activation events stored in the queues by means of a FIFO method (FIFO: first-in-first-out) or a LIFO method (LIFO: last-in-first-out).

The control program can, for example, comprise a plurality of event chains and the execution environment can be configured to execute the individual event chains after one another or in parallel with one another. The monitoring module can then be configured to check the execution durations of the functional modules of the individual event chains in each case for an exceeding of time durations that are in each case separately predefined for the individual event chains. In this respect, the time durations that are in each case separately predefined for the individual event chains can be identical or can at least partly or completely differ from one another.

The execution environment can comprise a plurality of part environments that can be executed separately from one another, wherein the individual part environments are configured to be executed on separate execution resources of the controller. The execution resources can, for example, be tasks, processors, or the like. For example, the execution resources can be resources defined in IEC 61499.

The execution resources can generally be provided by one or more logic units of the controller, for instance by CPUs or microprocessors. In this respect, the execution resources can provide mechanisms and context information that allow an execution of the control program on the logic unit. The individual logic units can in this respect be configured to provide more than one, for example two, execution resources in parallel and independently of one another.

The monitoring of the execution duration by the monitoring module can, for example, be limited to functional modules that are executed on the same execution resource or in the same part environment. Thus, different execution priorities of the individual functional modules can, for example, be taken into account in the monitoring if program parts or event chains of different priorities are executed in different part environments. In general, the individual event chains of the control program can each only comprise functional modules that are each executed on the same execution resource of the programmable logic controller. Alternatively, at least one of the event chains can also comprise functional modules executed on different execution resources.

The monitoring module can be configured to determine an execution duration that has already elapsed based on a time stamp that indicates the start of the execution duration. In this respect, the monitoring module can compare the time stamp with a current time to determine the execution duration that has already elapsed. The monitoring module can also be configured to determine an already elapsed execution duration by means of a cyclic pulse generator, wherein the monitoring module is configured to count the pulses generated by the pulse generator and to determine the already elapsed execution duration from the number of pulses.

The monitored execution duration can start with the start of the execution of the first functional module of the event chain. Alternatively, the monitored execution duration can also start with the generation of the initial event to take account of delays between the generation of the initial event and the start of the execution of the first functional module or initial module of the event chain.

The monitored execution duration can also comprise an additional delay time that elapsed prior to the generation of the initial event. For example, the additional delay time can comprise a period of time that has elapsed since an external original event that triggers the generation of the initial event and that occurred outside the execution environment, for example, since the generation or detection of a sensor signal that triggers the execution of the event chain. The delay time can also comprise dead times that occur on a reading in of the sensor signals via a data link, for example, via a fieldbus connection.

The monitoring environment can be configured to determine the execution duration by checking a filling level of an event queue of the execution environment. In this respect, the execution environment or the execution module can manage a separate queue for each event chain or for each initial event. The end of the execution duration is reached when the queue is empty.

The execution environment or the execution module can be configured to perform an event-controlled time lapse control (event triggered scheduling). The execution environment can also be configured to distribute an available computing power of the programmable logic controller to the individual functional modules of the control program in accordance with predefined criteria, for example, uniformly (fair scheduling). The execution environment can implement a cyclic time lapse control for this purpose. For example, the execution environment can cyclically scan all the instances of functional modules for pending activation events (cyclic scan approach) and can process pending activation events in accordance with a predefined sequence.

The execution environment or the execution module can therefore be configured to cyclically process activation events present for the individual functional modules. In this respect, the monitoring module can be configured to determine the execution duration in that the monitoring module checks at the end of each cycle whether all the functional modules triggered by the activation events of the respective cycle have been executed. An exceeding of the predetermined time duration can then, for example, be determined in that still outstanding, unprocessed activation events of the completed processing cycle are present after an ending of a processing cycle. For example, the monitoring module can be configured to aggregate the pending activation events of the individual functional modules of the event chain after each processing cycle.

The execution environment or the execution module can be configured to associate the individual activation events with a predetermined processing cycle in each case, for example with the current processing cycle, for example by means of queues that are each associated with the functional modules and/or by means of markers. In this respect, the individual queues or markers can each only include or indicate activation events of an individual functional module.

The monitoring module can be configured to check the execution duration once after the execution of a last functional module of the event chain for the exceeding of the predefined time duration. This enables a resource-saving monitoring of the execution duration.

The monitoring module can also be configured to check the execution duration, in each case after the execution of the functional modules associated with the individual activation events of the event chain, for the exceeding of the predefined time duration. An exceeding of the predefined time duration can thereby already be determined in good time during the processing of the event chain and an associated exceeding response can be initiated. At the same time, the computing effort for the monitoring of the execution duration is kept low.

The monitoring module can, for example, be configured to periodically check the execution duration for the exceeding of the predefined time duration.

The monitoring module can, for example, be executed in parallel with the execution module, for example, as a separate task. The monitoring module can also comprise a timer, for instance a hardware timer, that is executed in parallel with the execution module. The timer can generate an interrupt as soon as it expires.

For example, the timer can be initialized with the predefined time duration and can be started at the start of the execution of the event chain and can be ended at the end of the execution of the event chain. The monitoring module can then determine the exceeding of the predefined time duration in that the timer expires during the execution of the event chain.

The timer can also be initialized with a period duration after which it is to be checked whether all the functional modules of the event chain have already been executed and whether the predefined time duration has already been exceeded. The timer can be started at the start of the execution of the event chain. If, after the timer has expired, the monitoring module determines that not all the functional modules of the event chain have been executed yet, but the predefined time duration has not yet been exceeded either, the timer can be initialized and started again with the period duration.

The execution environment can also comprise a statistics module that is configured to statistically evaluate the elapsed execution duration, for example, in each case after an execution of the individual functional modules. For example, the statistics module can determine a statistical quantity, for instance a minimum and/or a maximum and/or a mean value, of an age of individual activation events on their processing. Delays that trigger an exceeding of the predefined time duration can be easily localized by means of such a statistics module on the processing of the event chain.

The age of the individual activation events can be a period of time that has elapsed since the start of the execution duration. The age of the individual activation events can, for example, be calculated on a provision of the respective activation event at an event output of a preceding functional module and/or on a reception of the respective activation event at an event input of the respective functional module and/or on a processing of the respective activation event by an execution algorithm of the respective functional module. The age of the individual activation event can, for example, be calculated based on at least one time stamp indicating the start of the execution duration.

In an embodiment of the execution environment, a first activation event of the event chain forms an initial event generated on an activation of an external input interface of the execution environment and/or a last one of the functional modules to be successively executed forms an end module for causing a system response. Thus, a response time between the activation of the input interface and the system response that took place on the basis of the activation of the input interface can be monitored as the execution duration. This enables an efficient monitoring of the response times to input signals that are received via the input interface.

The system response can, for example, comprise activating an external output interface of the execution environment. Alternatively or additionally, the system response can also comprise a change of an internal state of the execution environment, for example, of an object managed within the execution environment. The system response can alternatively or additionally comprise storing a data value for further use.

The individual event chains of the control program can each be defined such that the initial modules of the individual event chains are each activated by an activation of an external input interface of the execution environment and the end modules of the individual event chains each trigger a system response of the execution environment. For example, a separate event chain can be defined for each combination of such an initial module and such an end module.

In accordance with an embodiment, the execution environment is configured to generate a time stamp indicating the start of the execution duration and the monitoring module is configured to determine the execution duration by comparing the time stamp with a current time. Such a time stamp makes it possible in a simple manner to determine an already elapsed execution duration at any desired subsequent point in time. Such time stamps also make it possible to reliably determine the execution duration when the activation events of the event chain are processed in a plurality of different part environments of the execution environment, for example, by transmitting the time stamps via event links between the individual part modules of the execution environment.

The time stamp can, for example, indicate the point in time at which the execution of the initial module of the event chain is started. Alternatively or additionally, the time stamp can also indicate the point in time at which the initial event is created. Delays between the creation of the initial event and the execution of the initial module can thereby be taken into account in the check of the execution duration.

The time stamp can also take into account the additional delay time before the creation of the initial event. The delay time can comprise a delay preceding the creation of the initial event based on an indeterministic data processing and/or an indeterministic data transfer, for instance, an indeterministic data transfer of a sensor signal. The delay time can in particular comprise the dead time for the data transmission of sensor signals via a bus system.

The monitoring module can be configured to check the execution duration in each case by comparing the current time with the time stamp of the activation event of the respective executed functional module. This check can, for example, in each case take place once after the execution of the individual functional modules or also during their execution. The monitoring module can be configured to compare the time stamp with the current time in each case only after the execution of the individual functional modules of the event chain. The monitoring module can also compare the time stamp with the current time, for example a multiple of times or periodically, during the execution of the individual functional modules of the event chain.

The execution environment can, for example, be configured to associate the same time stamp with all the activation events of the event chain.

In accordance with an embodiment, the execution environment is configured to first associate the time stamp with an initial event of the event chain that triggers the execution of a first functional module. On the execution of the individual functional modules, activation events are in each case created for functional modules to be subsequently executed and the time stamp of the activation event of the respective executed functional module is associated with the activation events of the functional elements to be subsequently executed. It is thereby made possible to assign the time stamp iteratively to all the activation events of the event chain during the runtime of the control program.

The execution environment can, for example, associate the time stamp with the initial event during the runtime of the control program and/or on its creation. Subsequently, the execution environment can also associate the time stamp with all the activation events of the event chain subsequently created on the basis of the initial event during the runtime of the control program and/or on their respective creation, for instance, by copying the time stamp of the respective executed functional module. The activation events for functional modules to be subsequently executed can in each case be generated during or at the end of the execution of the individual functional modules.

In accordance with an embodiment, the execution environment for executing the functional modules comprises a plurality of part environments that can be executed separately from one another, wherein the part environments can be executed on separate execution resources of the controller. The event chain comprises a first functional module, which is triggered by an initial event of the event chain and which is executed in a first part environment, and a second functional module that is triggered by a temporally following subsequent event of the event chain and that is executed in a second part environment. Furthermore, the monitoring module comprises a first part module and a second part module, wherein the first part module is configured to monitor the execution duration in the first part environment, and wherein the second part module is configured to monitor the execution duration in the second part environment.

Due to the part modules of the monitoring module, it is also possible to monitor the execution duration across resources for an exceeding of the predefined time duration. The part modules can in this respect be connected to one another via a communication link, with information for determining the execution duration that has already elapsed being exchanged via the communication link. For example, information on the execution duration that elapsed during the execution in the first part environment can be transmitted from the first part module to the second part module via the communication link. The communication link can, for example, be implemented via a bus system, for instance a fieldbus system, between the first and second execution resource.

The transmitted information can, for example, directly comprise a part execution duration that already elapsed during the execution in the first part environment or can consist of the part execution duration. The second part environment can then take the partial execution duration into account in the monitoring of the execution duration, for example, by adding the part execution duration to a further part execution duration determined in the second part environment.

The transmitted information can comprise a point in time of the start of the execution duration or can consist of this point in time. For example, the transmitted information can comprise a time stamp including the start of the execution duration or can consist of such a time stamp. For example, the time stamp can be transmitted from the first execution environment to the second execution environment, for instance via an event link connecting the first and second part environments. In the second part environment, the time stamp can then be assigned to the first activation event of the event chain created within the second part environment. In addition, the time stamp can also be assigned to all further activation events created on the second execution environment. If the second part environment is configured to determine the execution duration based on time stamps associated with the individual activation events, the part execution duration can be taken into account in the creation of the time stamp of the activation event of the first functional module to be executed in the second part environment.

In accordance with an embodiment, the execution environment is configured to transmit a time stamp indicating the start of the monitored execution duration from the first part environment to the second part environment via a communication link. The second part module can thereby determine the execution duration in a simple manner in that the transmitted time stamp is compared with the current time.

In this respect, the transmitted time stamp represents the aforementioned information on the determination of the execution duration that has already elapsed during the execution in the first part environment. To determine the current time, the first and second part environments can comprise time bases synchronized with one another.

In accordance with an embodiment, the execution environment comprises a communication channel between the first and second part environment, wherein the execution environment is configured to communicate, via the communication channel, an exceeding of the predefined time duration determined by the second part module to the first part module. The first part module is thereby also enabled to trigger an exceeding response triggered by the exceeding of the predefined time duration.

For example, all the devices that execute functional modules of the event chain can execute an exceeding response, in particular in the case of part modules implemented on different devices.

The communication channel for transmitting the determined exceeding of the predefined time duration can also be designated as an exceeding channel. The exceeding channel can be designed as a bidirectional communication channel between the two part environments.

In addition to the first and second part environments, the execution environment can comprise a third part environment and the monitoring module can comprise a third part module. The third part environment and the third part module can be executable or executed on a separate execution resource of the controller. The control program can comprise a plurality of further functional modules to be successively executed that form a further event chain. A first further functional module of the further event chain can in this respect be executed in the first part environment and a second further functional module can in this respect be executed in the third part environment.

The first part environment and the third part environment can be connected to one another via a further communication channel. The execution environment can be configured to transmit the exceeding of the predefined time duration, which is determined by the second part module and transmitted to the first part module via the communication channel, to the third part module via the further communication channel. A reception of the exceeding of the predefined time duration transmitted via the further communication channel can then trigger an exceeding response of the third part module.

In general, in cases in which the time duration predefined for the execution of the event chain is exceeded, an exceeding response can be triggered in all the execution resources that execute one of the functional modules of the event chain. An exceeding response can additionally also be triggered in all those execution resources that execute functional modules of further event chains that are associated with the event chain. The further event chains associated with the event chain can, for example, be all the event chains that include at least one functional module that is executed in the same part environment as one of the functional modules of the event chain.

The further event chains associated with the event chain can also be all the event chains that serve to control a system part and/or a sub-function of a system controlled by the control program. The further event chains associated with the event chain can alternatively or additionally also comprise all the event chains that are connected to a predefined group of peripheral devices of the system, for example a predefined group of sensors and/or actuators, for instance drives, motors or the like, and/or IO channels, and, for instance, serve to evaluate and/or control the group of peripheral devices. An execution of exceeding responses can thereby be limited to the event chain and all further event chains associated with the event chain and thus, for example, to a system part or a sub-function of the controlled system.

For individual further event chains associated with the event chain, different exceeding responses of the execution resources executing the respective further event chains can be triggered. For example, for one portion of the further event chains, a setting into a safe state can be executed as an exceeding response and, for another portion of the further event chains, a shutdown controlled by a user program can be executed. For this purpose, associated event chains, for instance event chains of individual system parts, can be definable in a programming environment for creating the control program. In addition, relationships between associated event chains can be definable.

To activate the functional modules to be executed in the second part environment, the first part environment can be connected to the second part environment via an event channel. In this respect, an activation event for activating a first functional module in the second part environment is transmitted via the event channel after the execution of a last functional module in the first part environment. Together with the activation event, an associated time stamp can also be transmitted via the event channel.

The event channel and/or the exceeding channel can, for example, be implemented via a communication link connecting the first execution resource to the second execution resource, for example, a bus system. The exceeding of the predefined time duration determined by the second part module can be transmitted to the first part module via the exceeding channel by means of an exceeding message.

Between the two part environments, a plurality of event channels can be configured to transmit a plurality of activation events, for example, to transmit activation events of a plurality of event chains. Accordingly, a plurality of exceeding channels can also be established between the two part environments. Alternatively, only a single exceeding channel can also be established between the two part environments, for example, when the first part environment in each case triggers the same exceeding response for all exceedings of the time durations respectively predefined for the execution of the individual event chains.

A first exceeding response, which the first part environment performs on an exceeding of the predefined time duration determined by the second part environment, can differ from a second exceeding response which the second part environment performs on the determination of the exceeding of the predefined time duration.

In general, the executed exceeding responses can be configurable by a user in all the embodiments of the execution environment. The exceeding responses can, for example, comprise outputting an output signal. The exceeding responses can also trigger an execution of a separate control program or an input to a further control program executed in parallel, for example, to a non-safety-related standard control program. The exceeding responses can each cause a transfer of a machine controlled by the controller to a safe state.

The exceeding responses can further comprise aborting the execution of the control program in at least one part environment of the execution environment or also in all the part environments of the execution environment. However, on the exceeding of the predefined time duration, the control program can also be further executed in at least one part environment or in all part environments.

In addition to the exceeding message, diagnostic information can also be transmitted from the second part environment to the first part environment via the exceeding channel. The diagnostic information can, for example, comprise an identifier of the part environment in which the exceeding of the predefined time duration was determined. The identifier can, for example, also be an identifier of the execution resource or of a part device of the controller that executes the part environment. In cases in which the first part environment forwards the exceeding of the predefined time duration determined by the second part environment to further part environments, the first part environment can forward the identifier together with the exceeding message. In these cases, it can also be determined in the further part environments in which part environment the exceeding of the predefined time duration was determined.

The individual part environments can be configured to evaluate the transmitted identifier and to perform an exceeding response in dependence on the transmitted identifier, for example, to execute different exceeding responses for different transmitted identifiers.

The diagnostic information can additionally also comprise an event identifier, wherein the event identifier indicates that activation event on whose execution the exceeding of the predefined time duration was determined.

Alternatively or additionally, the individual part modules can also be configured to directly store the diagnostic information, for example, on the part device executing the respective part module or on a central device connected to the individual part devices via a data link.

In accordance with an embodiment, the execution environment comprises a part environment connected to a plurality of further part environments via communication channels, wherein the part environment connected to the plurality of further part environments is configured to transmit an exceeding of the predefined time duration, which is received via one of the communication channels, via the remaining communication channels to all of the remaining part environments connected via the communication channels. This enables an easy forwarding of the exceeding messages in accordance with the peer-to-peer principle.

The part environment connected to the plurality of further part environments can be configured to store information on the communication channel via which the exceeding of the predefined time duration was received, for example, to be able to make said information available to an evaluation module of the execution environment at a later point in time. The part environment connected to the plurality of further part environments can be configured to communicate the diagnostic information to all remaining part environments connected via the communication channels. Thus, not only the exceeding messages, but also the diagnostic information is distributed in accordance with the peer-to-peer principle.

In an embodiment of the execution environment, the control program comprises at least two event chains that comprise activation events for activating at least one common functional module, wherein the control program is configured to generate a first activation event of the first event chain and, alternatively or cumulatively, a second activation event of the second event chain after the execution of the common functional module. The monitoring module is then configured to check the execution duration of the functional modules of the first event chain for the exceeding of the predefined time duration and to check the execution duration of the functional modules of the second event chain for an exceeding of a further predefined time duration or not to perform a check of the execution duration of the functional modules of the second event chain.

Since the exceeding of a predefined time duration is monitored in different ways, in particular based on different predefined time durations, for all the activation events of the first event chain generated from the execution of the common functional module and for all the activation events of the second event chain generated from the execution of the common functional module, the monitoring of the execution duration of the individual event chains can be flexibly adapted, for example, to different priorities or safety requirements on the execution of the individual event chains.

Different priorities or predefined time durations can, for example, be assigned to the first activation event and the second activation event on their generation during the execution of the control program, for example, in the form of additional information or attributes associated with the respective activation event. The priorities or time durations can then be adopted for all subsequent events generated on the basis of the first activation event or on the basis of the second activation event. The affiliation of the activation events generated by the common functional module to the first and second event chains or the priority or predefined time duration of the first and second activation events can, for example, be stored in the control program and can, for example, have been assigned during the creation of the control program.

The common functional module can, for example, comprise an algorithm or a logical link that generates intermediate information. This intermediate information can then be used by the functional modules of the first event chain for a time-critical and/or safety-critical control of an actuator, while the functional modules of the second event chain process the intermediate information further within the framework of non-time-critical and/or non-safety-critical functions, for example, store it for later analysis. In these cases, the time duration predefined for the first event chain can be different from a time duration predefined for the second event chain or only the execution duration of the first event chain can be checked for the exceeding of a predefined time duration, but not the execution duration of the second event chain.

In an embodiment of the execution environment, the monitoring module is configured to check whether a total time duration predefined for the execution of a plurality of functional modules of the event chain is exceeded. The total time duration can also be predefined for the execution of all the functional modules of the event chain. Since the total time duration for the execution of a plurality of or all the functional modules of the event chain is predefined, a delay in the execution of individual functional modules can be compensated by a rapid execution of other functional modules without an exceeding of the predefined time duration being prematurely determined.

In an embodiment of the execution environment, the monitoring module is configured to check whether individual time durations predefined for the execution of individual functional modules of the event chain are exceeded. This makes it possible to detect at an early stage an imminent exceeding of a total time duration permitted for the execution of all the functional modules of the event chain.

In this respect, different individual time durations can be predefinable for the individual time durations of functional modules executed in different part environments of the execution environment. In this respect, the individual time durations can in each case be uniformly predefinable for all the functional modules executed in the respective same part environment. However, a separate individual time duration can also be individually predefinable for each individual functional module of the event chain. For at least one of the different individual time durations, for example for each individual time duration, an unlimited time duration can also be predefinable in each case.

The monitoring module can be configured to execute an exceeding response as soon as the exceeding of one of the individual time durations has been determined. The exceeding response can in each case depend on the exceeded individual time duration or on the functional module whose individual time duration was exceeded.

For the monitoring module, individual functional modules can be predefinable on whose execution the checking for an exceeding of the associated predefined individual time duration is paused, for example, during an initialization of the controller. Alternatively or additionally, part environments can also be predefinable on whose execution the checking of the executed functional modules for an exceeding of the associated predefined individual time durations is paused.

In an embodiment of the execution environment, the monitoring module is configured to monitor execution durations of a plurality of event chains for an exceeding of predefined time durations in each case, wherein the time durations predefined for the individual event chains are in each case predefined in dependence on initial events triggering the individual event chains. This makes it possible to differentiate between the individual initial events on the predefining of the time durations and, for example, to assign different time durations, for example shorter time durations, to time-critical and/or safety-critical initial events, for instance initial events based on time-critical and/or safety-critical sensor signals, than non-time-critical and/or non-safety-critical initial events.

In an embodiment of the execution environment, the monitoring module is configured, on an exceeding of the predefined time duration, to trigger an exceeding response, for example an alarm message and/or a control response, for example a control response for transferring a machine controlled by means of the control program to a safe state. The exceeding response can in particular be a safety response.

The monitoring module can be configured to monitor the execution duration of the event chain for the exceeding of the predefined time duration and additionally for an exceeding of a further predefined time duration and to trigger different exceeding responses on the exceeding of the predefined time duration and on the exceeding of the further predefined time duration. For example, the further predefined time duration can be shorter than the predefined time duration and a further exceeding response triggered on an exceeding of the further predefined time duration can represent advance information that the exceeding of the predefined time duration and an exceeding response triggered thereupon are imminent.

The further exceeding response can, for example, be a warning message, for example an alarm or a diagnostic message, and the exceeding response can then be a control response, for instance for transferring the machine controlled by means of the control program to a non-critical and/or controlled and/or safe state.

The monitoring module can be configured to interrupt the execution of the functional modules by the execution module as soon as the monitored execution duration exceeds the predefined time duration. In these cases, the execution module, instead of the functional modules of the event chain, can execute an exceeding program for controlling the exceeding response.

In an embodiment of the execution environment, the monitoring module is configured to check the execution duration, in each case after the execution of the functional modules associated with the individual activation events of the event chain, for the exceeding of the predefined time duration. In such a design of the monitoring module, the computing power required for monitoring the execution duration is limited compared to a continuous monitoring of the execution duration, for example. The execution duration can be checked for the exceeding of the predefined time duration in each case only after the execution of the functional modules associated with the individual activation events of the event chain.

In a further development of the execution environment, the monitoring module is configured to check the execution duration during the execution of the individual functional modules of the event chain for the exceeding of the predefined time duration. This enables a particularly prompt response to an exceeding of the predefined time duration.

A method of executing an event-oriented control program of a programmable logic controller is furthermore set forth, wherein the control program comprises a plurality of functional modules to be successively executed, and wherein the functional modules are executed in an event-controlled manner on the occurrence of activation events that are each associated with the individual functional modules. In this respect, the method comprises the following steps:
 forming an event chain from the activation events of the functional modules to be successively executed;
 monitoring an execution duration of the functional modules of the event chain; and
 checking the execution duration for an exceeding of a predefined time duration.

The method can be a computer-implemented method. The method can in particular be performed by means of the specified execution environment. Conversely, the execution environment can be configured to perform individual steps or all the steps of the specified method on an execution on a controller. In this respect, all the effects and further developments that have been disclosed in connection with the execution environment also relate to the method specified and vice versa.

The formation of the event chain from the activation events can, for example, take place during an analysis of the control program prior to its execution. The analysis of the control program can, for example, be executed by means of a programming environment for creating the control program. On the formation of the event chain, all the functional modules that are executed in order, starting with an initial module, to execute an end module can be determined and the associated activation events can be combined in the event chain. Analogously, a separate event chain can in each case be formed for all possible combinations of initial modules and end modules.

In addition, a programmable logic controller having a memory module is set forth, wherein the specified execution environment is stored in the memory module for execution by the controller. The controller can provide a plurality of execution resources. In this respect, the execution resources can be arranged at least partly distributed in different part devices of the controller. The part devices can be connected to one another via a communication link, for instance, a wireless and/or wired link. The communication link can be a fieldbus system, for example. The part devices can each comprise their own memory modules formed separately from one another and the part environments of the execution environment to be executed by the respective part devices can in each case be stored in the memory modules.

A non-volatile, computer-readable medium is further set forth on which instructions for executing individual steps or all the steps of the specified method or for implementing the described execution environment are stored. The computer-readable medium can, for example, be configured as a physical medium, for instance as a CD or DVD, or as a data storage location that is accessible via a data link, for example the Internet. The medium can, for example, be designed as an online software repository or as a cloud data store.

Figure 2:
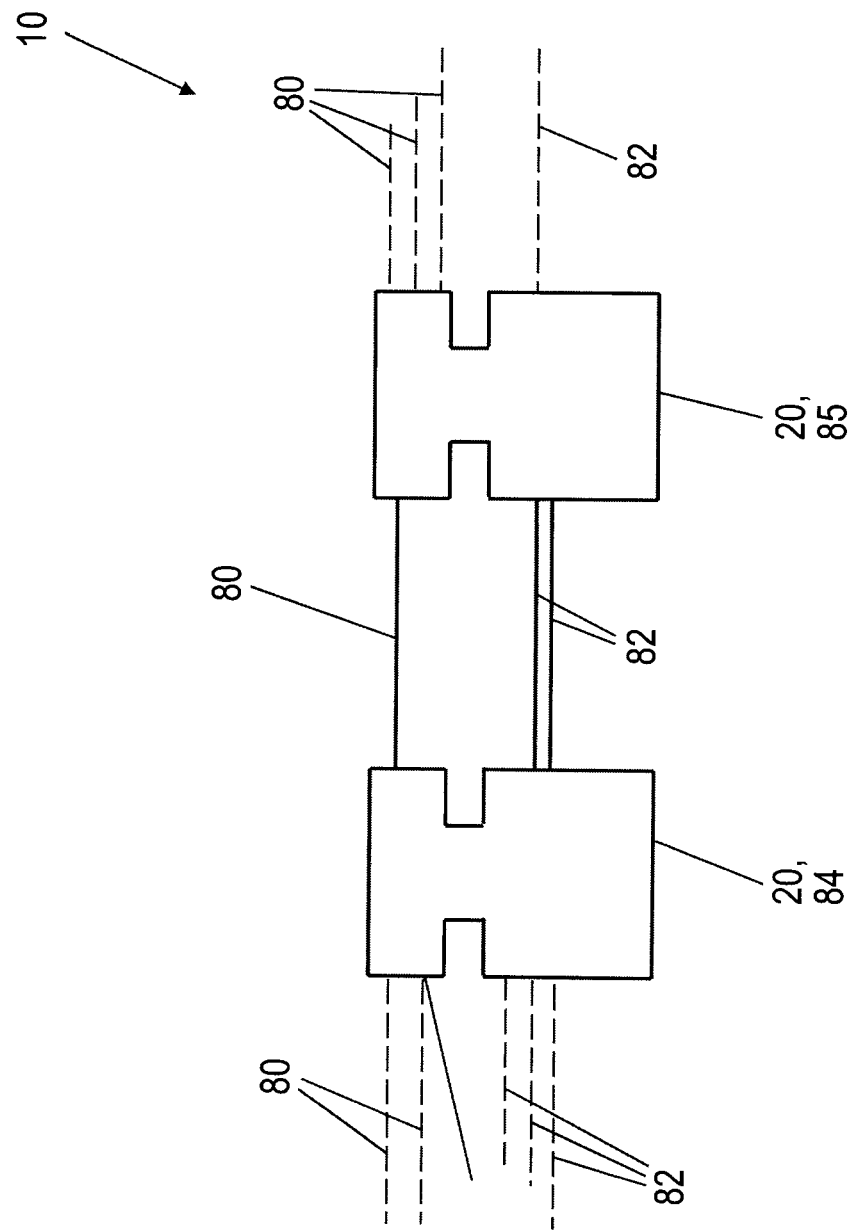
Figure 3:
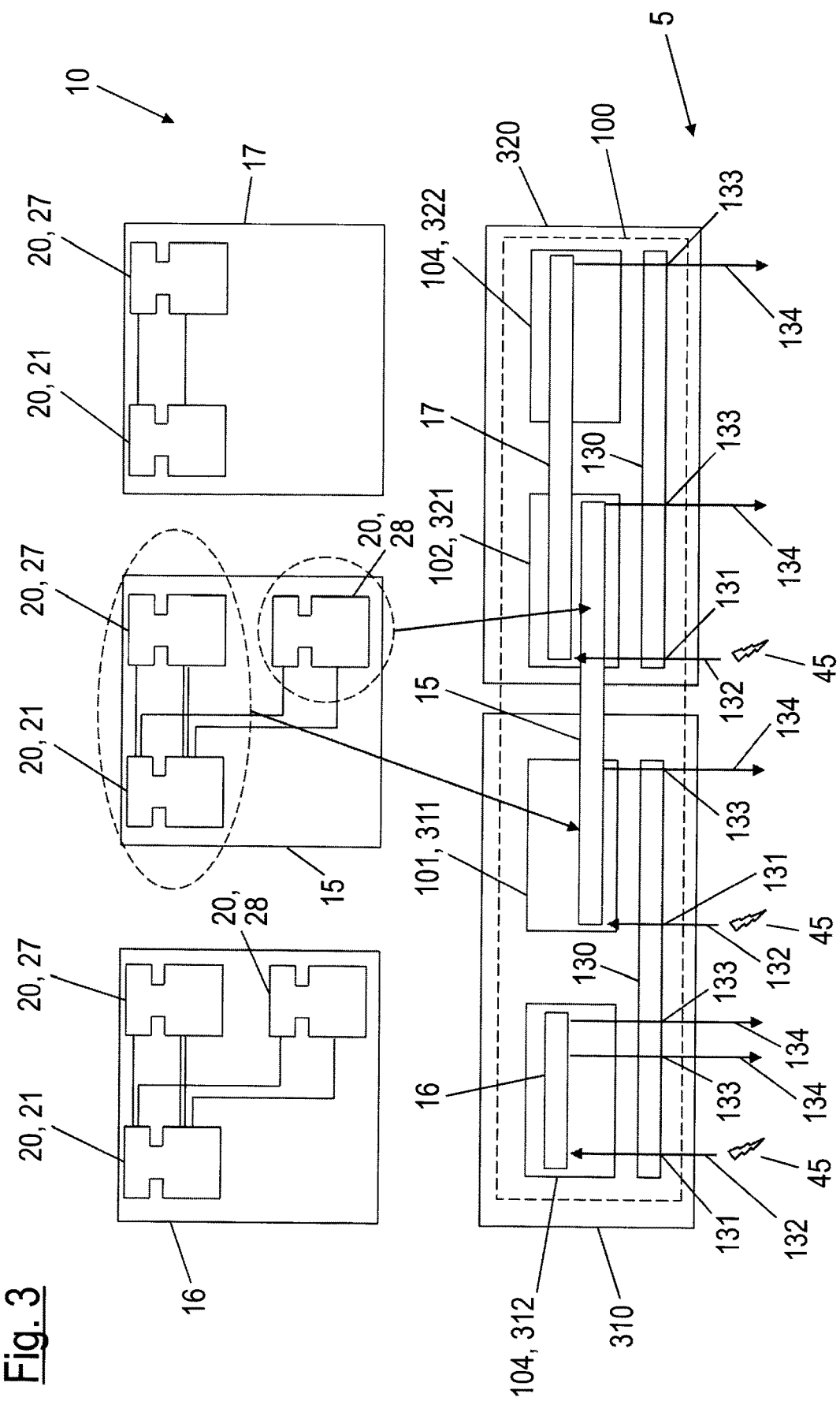
Figure 4:
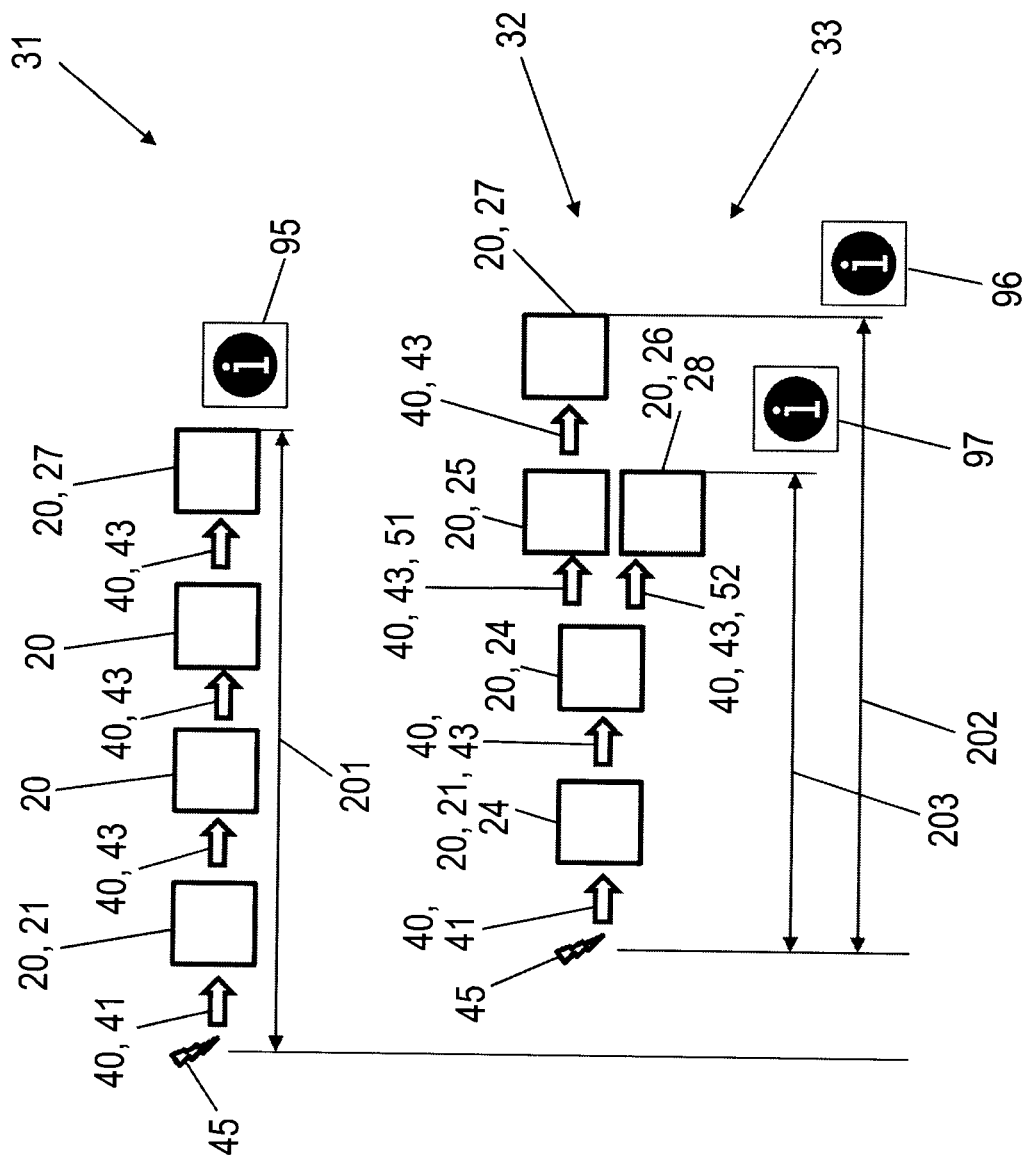
Figure 5:
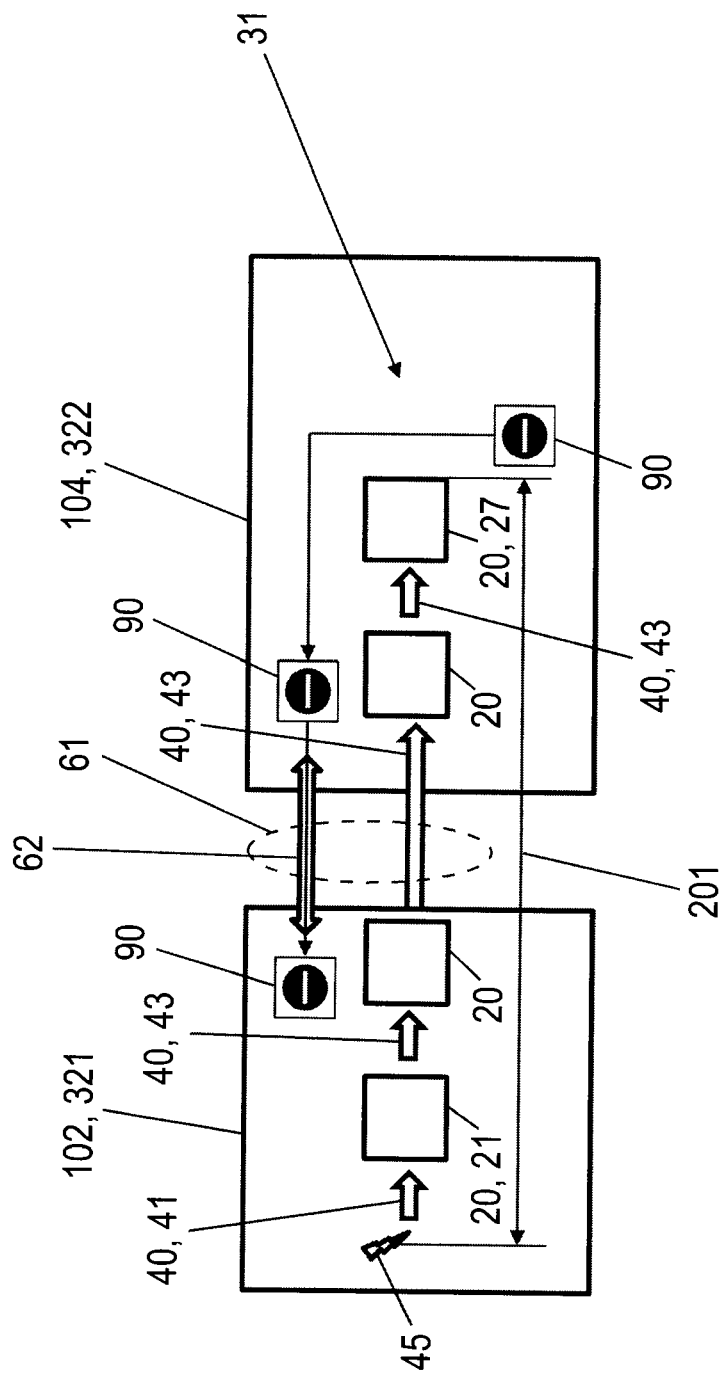
Figure 6:
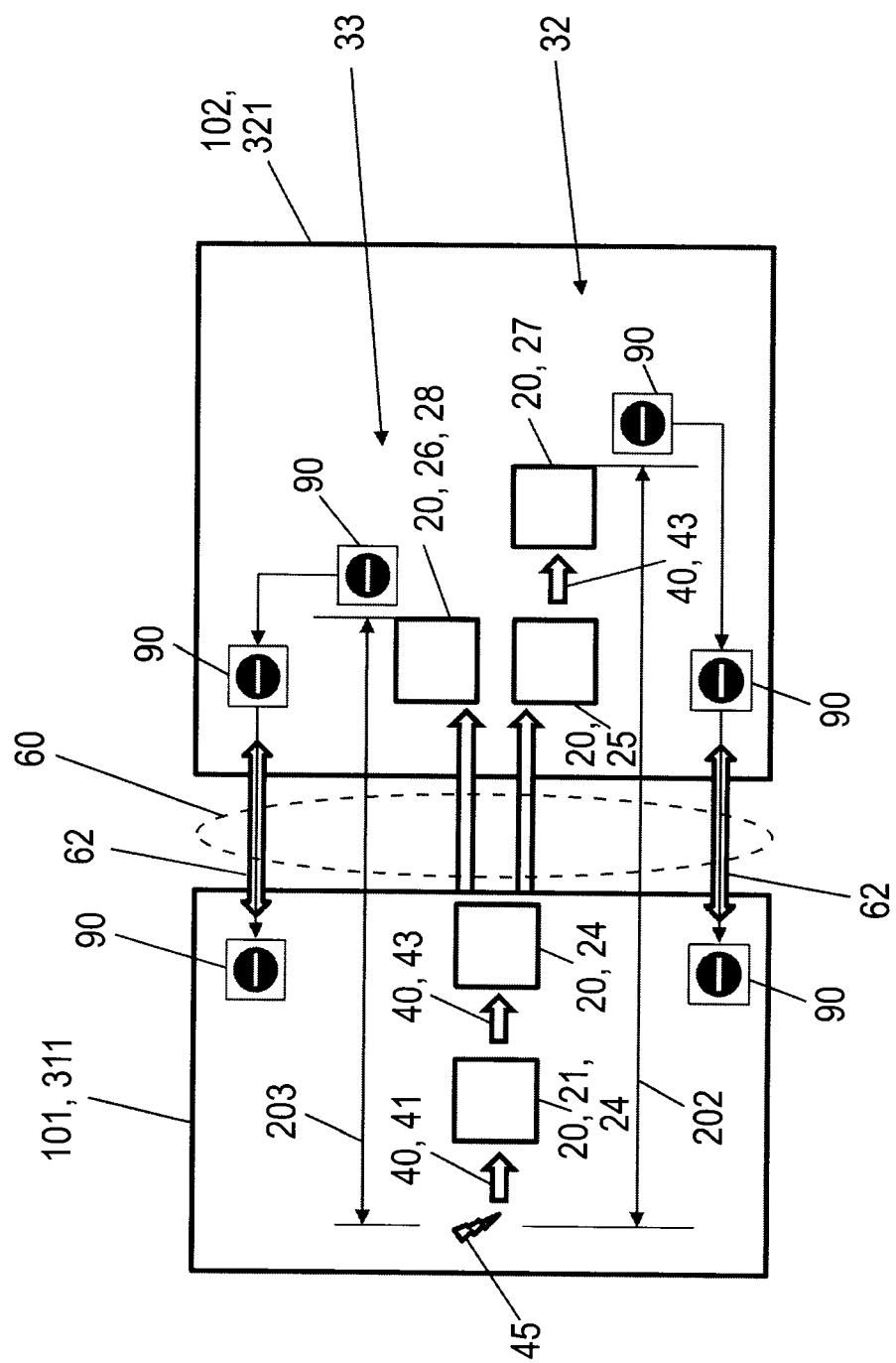
Figure 7:
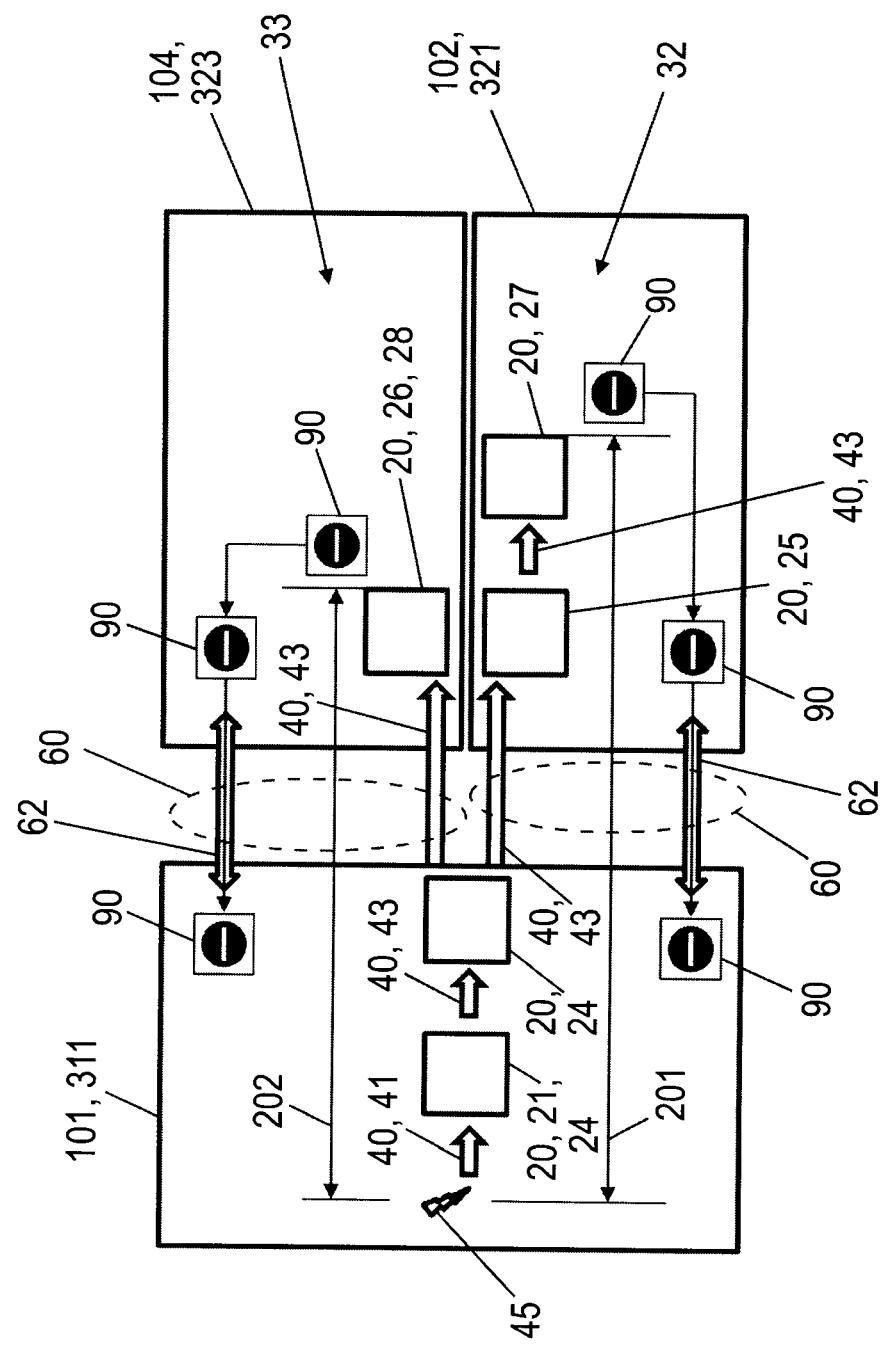
Figure 8:
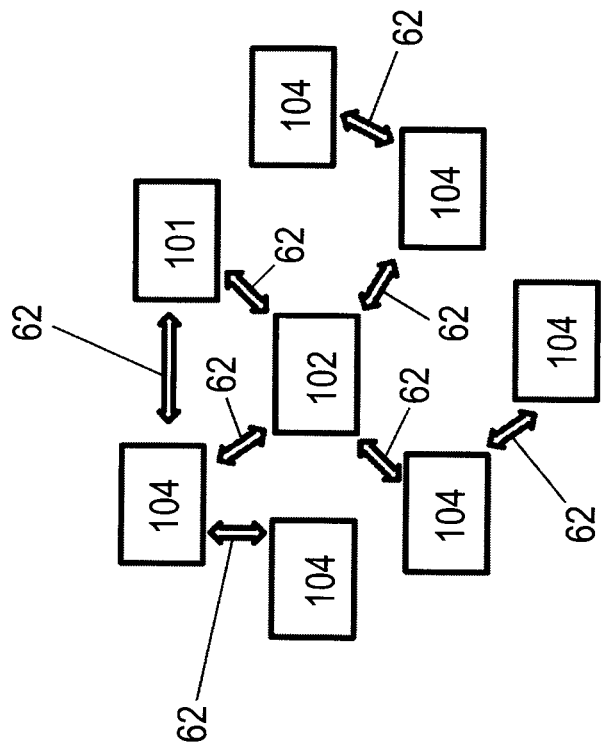
Figure 9:
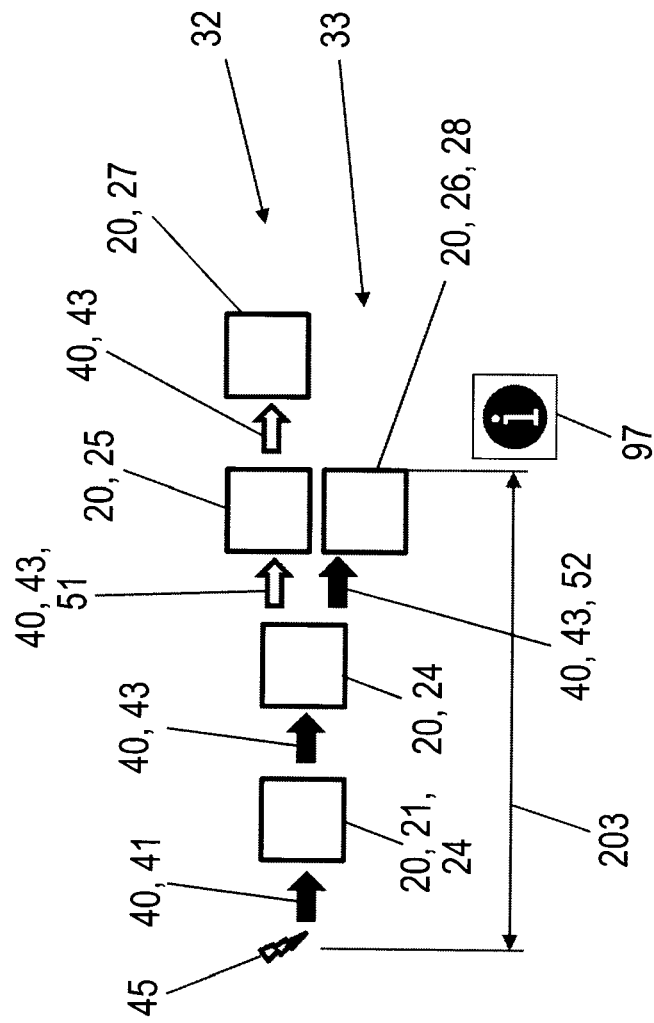
Figure 10:
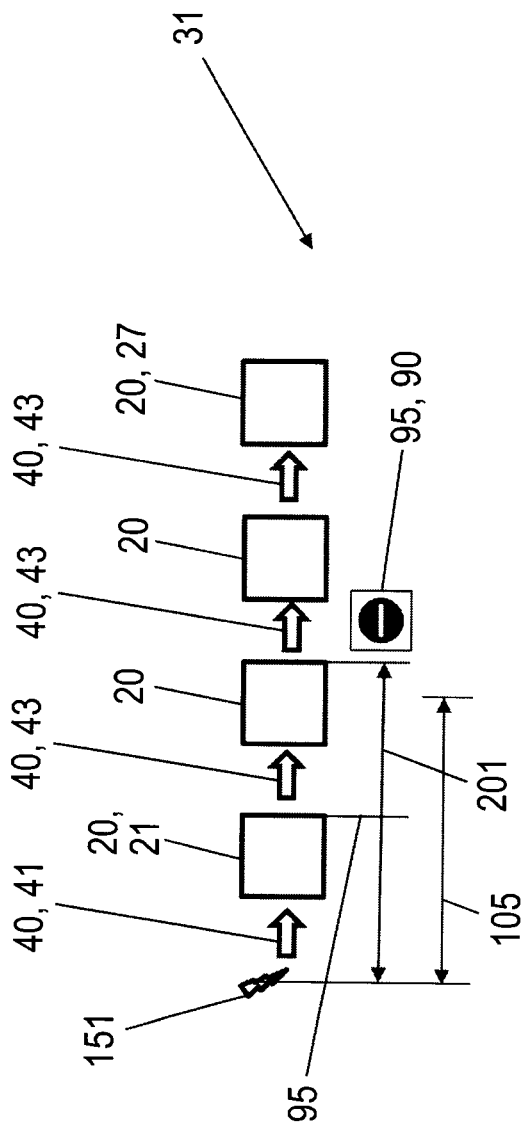
Figure 11:
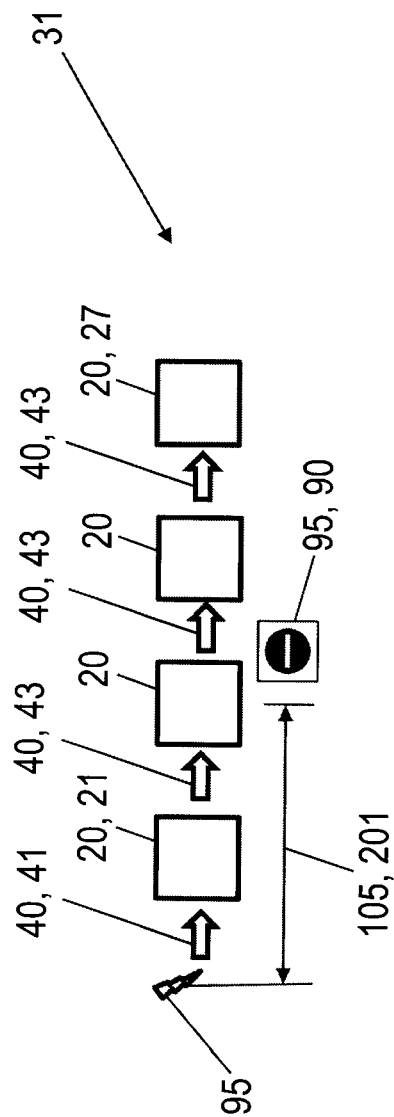

The invention will be explained by way of example in the following with reference to Figures. In this respect, there are shown in a schematic representation in each case:

FIG. 1 a machine comprising a controller for executing an event-controlled control program;

FIG. 2 functional modules of the control program;

FIG. 3 an execution environment for executing the control program by the controller;

FIG. 4 event chains of the control program;

FIG. 5 a transmission of an exceeding of a predefined time duration between execution resources of the controller;

FIG. 6 transmissions of further exceedings of a predefined time duration between execution resources of the controller;

FIG. 7 a further embodiment of the execution environment;

FIG. 8 a further embodiment of the execution environment;

FIG. 9 a further embodiment of the execution environment;

FIG. 10 a further embodiment of the execution environment;

FIG. 11 a further embodiment of the execution environment; and

Figure 12:
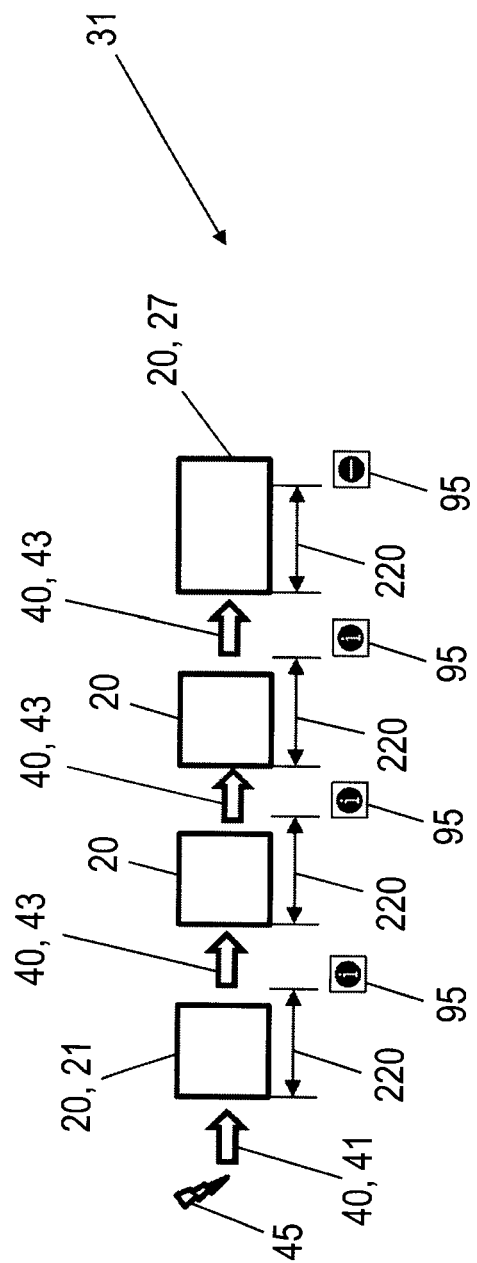

FIG. 12 a further embodiment of the execution environment.

FIG. 1 shows a machine 1 that is configured by way of example for handling workpieces 195. The machine 1 comprises a conveyor 186 on which the workpieces 195 are delivered, and a gripper 181 by means of which the workpieces 195 are picked up from the conveyor 186 and are subsequently deposited elsewhere. To move the gripper 181, the machine 1 comprises a transverse kinematic unit 182 driven by a first actuator 183, and a vertical kinematic unit 184 driven by a second actuator 185. The conveyor 186 is driven by a third actuator 187. The actuators 183, 185, 187 are in this respect each configured as electric drives.

In addition to the actuators 183, 185, 187, the machine 1 comprises a safety-related sensor 188 that measures the spacing of the gripper 181 from the individual workpieces 195 on the conveyor 186, and a further, non-safety-related sensor 189 which is configured as a user interface and via which characteristic data of the workpieces 195 can be predefined.

The machine 1 furthermore comprises a programmable logic controller 5 connected to the actuators 183, 185, 187 and the sensors 188, 189 via a communication link 60 configured as a field bus. The programmable logic controller 5 comprises a first part device 310 and a second part device 320 that are connected to the communication link 60 separately from one another. Via the communication link 60, input signals are transmitted from the sensors 188, 189 to the part devices 310, 320 of the controller 5 and output signals are transmitted from the part devices 310, 320 to the actuators 183, 185, 187.

The controller 5 has an event-oriented control program 10, wherein a first part program 11 of the control program 10 is stored in a memory module of the first part device 310 and a second part program 12 of the control program 10 is stored in a memory module of the second part device 320. The control program 10 comprises all the instructions for reading in the sensor signals via the communication link 60, for generating the output signals by means of a logical link of the read-in sensor signals, and for outputting the output signals via the communication link 60.

To execute the control program 10, the controller 5 comprises an execution environment 100 having a first part environment 101 executed on the first part device 310 and a second part environment 102 executed on the second part device 320. The part environments 101, 102 of the execution environment 100 each comprise execution modules 120 for executing the control program 10 and part modules 111, 112 of a monitoring module 110 for monitoring the execution duration of the control program 10 by the programmable logic controller 5. In this respect, a first part module 111 of the monitoring module 110 is a component of the first part environment 101 and a second part module 112 of the monitoring module 110 is a component of the second part environment 102.

On the execution of the control program 10, it has to be ensured that the actuators 183, 185 for moving the gripper 181 respond within predefined time durations to an input signal read in via the safety-related sensor 188 to indicate an approach of the gripper 181 to the workpieces 195. Otherwise, there would be a risk of the gripper 181 colliding in an uncontrolled manner with the workpieces 195 and damaging them. In this respect, the input signals provided by the safety-related sensor 188 represent safety-critical input signals.

In contrast, the parameters of the workpieces 195 read in via the sensor 189 are only used to optimally adapt the movement of the gripper 181 to the mass inertia of the workpieces 195. For this purpose, the read-in parameters are used on the execution of the control program 10 to create adapted output signals for the actuators 183, 185. The creation of the adapted output signals represents a non-safety-related part of the control program 10 that is not subject to any time requirements.

The monitoring module 110 is configured to monitor the execution duration of that program part of the control program 10 which controls the response of the gripper 181 to the input signals provided by the safety-critical sensor 188 for an exceeding of a predefined time duration and, on an exceeding of the predefined time duration, to trigger as an exceeding response a safety response for transferring the machine 1 to a safe state, namely for stopping the gripper 181 and the conveyor 186. Such an exceeding of the predefined time duration in the case of a response to input signals from the sensor 188 can, for example, occur when an ongoing creation of the adapted output signals on the basis of the sensor signals of the sensor 189 is not interrupted in good time, for example, due to a programming error of the control program 10.

The control program 10 is designed in accordance with the specifications of the IEC 61499 standard and comprises a plurality of functional modules configured as function blocks in accordance with IEC 61499. Two of these functional modules 20 are shown by way of example in FIG. 2. The individual functional modules 20 are each connected to one another via event links 80 and data links 82. In this respect, the individual event links 80 each connect an event output of a preceding functional module 84 to an event input of a subsequent functional module 85. Via the event inputs, the individual functional modules 20 receive activation events that trigger an execution of the individual functional modules 20. Via the event outputs, the individual functional modules 20 in turn provide activation events that cause an execution of subsequent functional modules 85. The data required for the execution of the individual functional modules 20 are transmitted between the functional modules 20 via the data links 82.

FIG. 3 shows the implementation of the execution environment 100 on the part devices 310, 320 of the programmable logic controller 5. To execute the control program 10, the first part device 310 provides a first execution resource 311 and a second execution resource 312. The second part device 320 provides a third execution resource 321 and a fourth execution resource 322. The execution environment 100 comprises a first part environment 101 that is executed on the first execution resource 311, and a second part environment 102 that is executed on the third execution resource 321. Further part environments 104 of the execution environment 100 are in each case executed on the second and fourth execution resources 312, 322.

The control program 10 comprises a first application 15, a second application 16, and a third application 17. The applications 15, 16, 17 each comprise functional modules 20 connected via event and data links, wherein the first and second applications 15, 16 each comprise an initial module 21 and a respective one first and second end module 27, 28 connected to the initial module 21 of the respective application 15, 16. The third application 17 comprises only a single end module 27 connected to an initial module 21. In this respect, the individual end modules 27, 28 can be connected to their respective initial module 21 via additional functional modules 20, not shown in FIG. 3, in each case. Furthermore, the individual applications 15, 16, 17 can each have more than one initial module 21. The initial modules 21 are each service function blocks in accordance with IEC 61499 configured as responder function blocks.

On an execution of the control program 10, all the functional modules 20 connected to one another via event links are executed in order, starting from the individual initial modules 21, until the execution of the individual end modules 27, 28. The first application 15 is executed distributed in the first part environment 101 on the first execution resource 311 and in the second part environment 102 on the third execution resource 321. In this respect, a program part resulting in the execution of the first end module 27 is executed completely in the first part environment 101 and a program part resulting in the execution of the second end module 28 is executed partly in the first part environment 101 and partly in the second part environment 102. The second application 16 is executed completely in the further part environment 104 executed on the second execution resource 312 and the third application 17 is executed in a distributed manner in the second part environment 102 and the further part environment 104 executed on the fourth execution resource 322.

In the control program 10 shown, the execution of the initial modules 21 is in each case triggered by external origin events 45 that consist of the acquisition of sensor signals 132 by the sensors 188, 189. The sensor signals 132 are transmitted to the part devices 310, 320 of the controller 5 via the communication link 60 and are read in by interface modules 130 of the execution environment 100 via external input interfaces 131 connected to the communication link 60. On the execution of the end modules 27, 28, output signals 134 are in each case created for the actuators 183, 185, 187 of the machine 1 and are transmitted to the actuators 183, 185, 187 via external output interfaces 133 of the interface modules 130 and the communication link 60 connected to the output interfaces 133.

If successive functional modules 20 are executed on different execution resources 311, 312, 321, 322, the event and data links between the respective functional modules 20 are executed via communication links that connect the execution resources 311, 312, 321, 322 to one another, for example, via the field bus 60 shown in FIG. 1 when execution resources 311, 312, 321, 322 are executed on different part devices 310, 320 or via internal bus systems of individual part devices 310, 320 when execution resources 311, 312, 321, 322 are executed on the same part device 310, 320.

The monitoring module 110 is configured to monitor the execution duration of the program parts of the control program 5 resulting in the execution of the individual end modules 27, 28. For this purpose, event chains are formed in each case, wherein the individual event chains each detect all the activation events of those functional modules 20 that are executed in order in response to one of the input signals 132 until the execution of one of the end modules 27, 28. In this respect, a separate event chain is formed for each combination of one of the input signals 132 and one of the end modules 27, 28 executed on the basis of the respective input signal 132.

In FIG. 4, a first event chain 31 is shown by way of example that comprises the activation events 40 of all the functional modules 20 that, starting with the initial module 21 of the third application 17, are generated in order until the execution of the end module 27 of the third application 17. The first event chain 31 comprises an initial event 41 for activating the initial module 21 and three subsequent events 43 for sequentially activating two further functional modules 20 and the end module 27.

A second event chain 32 that comprises the activation events 40 of all the functional modules 20 that are generated, starting with the initial module 21 of the first application 15, until the execution of the first end module 27 of the first application 15, and a third event chain 33 comprising the activation events 40 of all the functional modules 20 that are generated, starting with the initial module 21 of the first application 15, until the execution of the second end module 28 of the first application 15 are furthermore shown in FIG. 4.

The second and third event chains 32, 33 are triggered by the same external origin event 45 or by the same input signal 132. They each comprise an initial event 41 for activating an initial module 21 that forms a common functional module 24 of the second and third event chains 32, 33. They also each comprise a subsequent event 43 for activating a further common functional module 24. After the execution of the further common functional module 24, a first activation event 51 for activating a first subsequent module 25 and a second activation event 52 for activating a second subsequent module 26 are generated. The first activation event 51 is part of the second event chain 32 and the second activation event 52 is part of the third event chain 33.

After the first activation event 51, the second event chain 32 also comprises a subsequent event 43 for activating the first end module 27 of the first application 15. The second functional module 26 activated by the second activation event 52 also forms the second end module 28 of the first application 15 so that the third event chain 33 no longer comprises any further activation events 40 after the second activation event 52.

Finally, fourth and fifth event chains, which are also not shown in FIG. 4, are created for the control program 10 shown in FIG. 3. The fourth and fifth event chains comprise all the activation events of those functional modules that, starting from the initial module 21 of the second application 16, are executed in order until the execution of the first or second end module 27, 28 of the second application 16.

The monitoring module 110 is configured to perform a first check 95 in which a first execution duration 201 of the functional modules 20 of the first event chain 31 is checked for an exceeding of a first predefined time duration. If the first execution duration 201 exceeds the first predefined time duration, the monitoring module 110 performs a first exceeding response.

The first execution duration 201 starts with the origin event 45 triggering the execution of the first event chain 31 and ends with the completion of the execution of the end module 27 of the first event chain 31. To check the first execution duration 201, the monitoring module 110 generates a first time stamp that includes the point in time of the origin event 45. For this purpose, the monitoring module 110 adds an additional delay time, which has elapsed since the origin event 45 and during the transmission of the input signal 132 via the data link 60, at a point in time at which an initial event 41 triggering the initial module 21 is created. The time stamp is copied on the creation of the subsequent events 43 and is in each case transmitted together with the subsequent events 43 via the event links between the functional modules 20.

Analogously to the first check 95 of the first execution duration 201, the monitoring module 110 is configured to perform a second check 96 of a second execution duration 202 of the functional modules 20 of the second event chain 32 for an exceeding of a second predefined time duration and to perform a third check 97 of a third execution duration 203 of the third event chain 33 for an exceeding of a third predefined time duration. On the exceeding of the second predefined time duration, a second exceeding response is executed and, on the exceeding of the third predefined time duration, a third exceeding response is executed.

Since the end module 27 of the first event chain 31 is executed on the fourth execution resource 322, the first check 95 takes place by a part module of the monitoring module 110 executed on the fourth execution resource 322. The second check 96 takes place by a part module of the monitoring module 110 executed on the third execution resource 321 and the third check 97 takes place by a part module of the monitoring module 110 executed on the first execution resource 311.

FIG. 5 shows a transmission of an exceeding 90 of the first predefined time duration, which is determined on the fourth execution resource 322, on the execution of the first event chain 31 from the fourth execution resource 322 to the third execution resource 321.

The third and fourth execution resources 321, 322 are connected by an internal communication link 61, for instance an internal bus link, of the second part device 320. Via the internal communication link 61, a communication channel 62 is implemented via which the exceeding 90 of the first predefined time duration determined on the fourth execution resource 322 is transmitted to the third execution resource 321. Based on the transmitted exceeding 90, the part module of the monitoring module 110 executed on the third execution resource 321 triggers its own exceeding response. An activation event 40 for activating one of the subsequent modules 25 of the first event chain 31 is additionally also transmitted via the internal communication link 61.

In alternative embodiments, the third and fourth execution resources 321, 322 can be executed on separate part devices 310, 320 of the controller 5. In these cases, the communication channel 62 can also be designed via an external communication link connecting these two part devices 310, 320, for example, via the fieldbus 60.

FIG. 6 shows a transmission of exceedings 90 of the second and third predefined time durations on the execution of the second or third event chain 32, 33 via the communication link 60. In this respect, a variant of the execution environment 100 is shown in which both the first end module 27 and the second end module 28 of the first application 15 are executed on the third execution resource 321.

For the transmission of the exceeding 90 of the second predefined time duration on the execution of the second event chain 32 and for the transmission of the exceeding 90 of the third predefined time duration on the execution of the third event chain 33, separate communication channels 62 are in each case provided via the communication link 60. The communication channels 62 are implemented by communication data based on which a distinction can be made as to whether the first or second execution duration 202, 203 has exceeded its respective predefined time duration. This makes it possible to adapt the exceeding response triggered in the first execution resource 311 in dependence on the event chain 32, 33 whose execution duration 202, 203 has exceeded its predefined time duration.

In alternative embodiments, the exceedings 90 of the first and second predefined time durations can also be transmitted via a single communication channel 62 such that the transmitted data amount is reduced. In these cases, it is not possible to distinguish in the first execution resource 311 as to which event chain 32, 33 has exceeded its predefined time duration and the same exceeding response is always executed.

FIG. 7 shows an embodiment of the execution environment 100 in which the end modules 27, 28 of the second and third event chains 32, 33 are executed in separate execution resources, namely in the third execution resource 321 and in a further execution resource 323. The first and third execution resources 311, 311 and the further execution resource 323 are in this respect each implemented on separate part devices of the controller 5, wherein the part devices are connected to one another via the fieldbus 60. In this embodiment, exceedings 90 of the predefined timed durations determined in the individual execution resources are also transmitted on the fieldbus 60 via communication channels 62.

In FIG. 8, an embodiment of the execution environment 100 is shown in which the second part environment 102 executed on the third execution resource 321 is connected not only to the first part environment 101, but also to a further part environment 104 via communication channels 62. In addition, the first part environment 101 and/or the further part environment 104 is/are in turn connected to further part environments 104 of the execution environment 100 via communication channels 62.

The part modules of the monitoring module 110 executed in the individual part environments 101, 102, 104 are each configured to forward an exceeding of a predefined time duration, which is determined on an execution of an event chain itself, via the communication channels 62 to all the connected part environments 101, 102, 104 and the part modules of the monitoring module 110 executed therein. In addition, the part modules of the monitoring module 110 executed in the individual part environments 101, 102, 104 are each configured to forward exceedings, which are received via one of the communication channels 62, via all of the remaining communication channels 62.

In FIG. 9, an embodiment of the execution environment 100 is shown in which only the execution duration 203 of the second event chain 32 is checked for the exceeding of a predefined time duration, but not the execution duration of the third event chain 33. For this purpose, information is stored in the control program 10 that an event link for transmitting the first activation event 51 is associated with an event chain 32 whose execution duration is not checked and further information is stored that an event link for transmitting the second activation event 52 is associated with an event chain 33 whose execution duration is checked.

On the creation of the activation events 51, 52 during the runtime of the control program 10, the stored information can then be used to trigger a check of the execution duration of the third event chain 33 and to prevent a check of the execution duration of the second event chain 32. The information can, for example, be stored as attributes associated with the individual event links. In general, information can be stored for each event link of the control program 10 as to whether activation events transmitted via the respective event link are components of an event chain whose execution duration is monitored or not.

In the embodiments of the execution environment 100 described in connection with the preceding Figures, the execution durations of the individual event chains 31, 32, 33 are checked for an exceeding of the predefined time durations in each case only after the execution of the end modules 27, 28. In alternative embodiments of the execution environment 100, the execution durations of the event chains 31, 32, 33 can also, in each case after the execution of the individual functional modules 20, be checked for an exceeding of the predefined time duration.

Such an alternative embodiment is shown in FIG. 10. Here, an exceeding 90 of the first predefined time duration 105 is already determined, and an exceeding response is triggered, on a check 95 that is performed after the execution of the second functional module 20. Thus, in this embodiment, less time elapses after the expiration of the predefined time duration 150 until the checking module 110 determines the expiration of the predefined time duration 150 than in the embodiments described in connection with FIGS. 1 to 9.

As shown in FIG. 11, the check 95 for the exceeding 90 of the predefined time durations can also take place during the execution of the individual functional modules 20, for example, at periodic intervals. In such embodiments, the exceeding 90 of the predefined time durations is determined quasi-instantaneously.

FIG. 12 shows an embodiment of the execution environment 100 in which the execution duration of the event chain 31 is checked for an exceeding of a predefined time duration in that individual execution durations for the execution of the individual functional modules 20 of the event chain 31 are monitored for an exceeding of predefined individual time durations 220. Unlike shown in FIG. 12, the individual time durations 220 predefined for the execution of the individual functional modules 20 can in this respect also be of different lengths. In alternative embodiments, the total execution duration of the event chain 31 can additionally also be checked for an exceeding of a total time duration, for example, at periodic time intervals during the execution of the functional modules 20 and/or in each case after the execution of the individual functional modules 20 and/or only after the execution of the end module 27.

The modifications of the execution environment 100 described in connection with FIGS. 9 to 12 can, together or individually, also analogously be present in the embodiments described in connection with FIGS. 1 to 8.

REFERENCE NUMERAL LIST 1 machine
5 programmable logic controller
10 control program
11 first part program
12 second part program
15 first application
16 second application
17 third application
20 functional modules
21 initial module
24 common functional module
25 first subsequent module
26 second subsequent module
27 first end module
28 second end module
31 first event chain
32 second event chain
33 third event chain
40 activation events
41 initial event
43 subsequent event
45 external origin event
51 first activation event
52 second activation event
60 communication link
61 internal communication link
62 communication channel
80 event link
82 data link
84 preceding functional module
85 subsequent functional module
90 exceeding
95 first check
96 second check
97 third check
100 execution environment
101 first part environment
102 second part environment
104 further part environments
105 predefined time duration
110 monitoring module 111 first part module
112 second part module
120 execution module
130 interface module
131 external input interface
132 input signal
133 external output interface
134 output signal
181 gripper
182 transverse kinematic unit
183 first actuator
184 vertical kinematic unit
185 second actuator
186 conveyor
187 third actuator
188 safety-related sensor
189 sensor
195 workpiece
201 first execution duration
202 second execution duration
203 third execution duration
220 individual time duration
310 first part device
311 first execution resource
312 second execution resource
314 further execution resources
320 second part device
321 third execution resource
322 fourth execution resource
323 further execution resource

The invention claimed is:

1. An execution environment system comprising:
at least one processor for executing an event-oriented control program of a programmable logic controller by an execution environment, wherein the control program comprises program instructions that provide a plurality of functional modules to be successively executed,
wherein the execution environment includes program instructions to execute the functional modules on the programmable logic controller in an event-driven manner on the occurrence of activation events that are each associated with the individual functional modules,
wherein the individual activation events of the functional modules to be successively executed form an event chain,
wherein the execution environment comprises:
program instructions that provide a monitoring module for monitoring an execution duration of the functional modules of the event chain, and
program instructions that provide an execution module,
wherein the monitoring module is configured to check the execution duration for an exceeding of a predefined time duration,
wherein the monitoring module is formed separately from the execution module of the execution environment executing the individual functional modules of the event chain, and the monitoring module is configured, on the exceeding of the predefined time duration, to trigger an exceeding response.

2. The execution environment in accordance with claim 1, wherein a first activation event of the event chain forms an initial event generated on an activation of an external input interface of the execution environment.

3. The execution environment in accordance with claim 1, wherein the execution environment is configured to generate a time stamp indicating the start of the execution duration,
wherein the monitoring module is configured to determine the execution duration by comparing the time stamp with a current time.

4. The execution environment in accordance with claim 3,
wherein the execution environment is configured to first associate the time stamp with an initial event of the event chain that triggers the execution of a first functional module,
wherein, on the execution of the individual functional modules, activation events are in each case created for functional modules to be subsequently executed, and
wherein the time stamp of the activation event of the respective executed functional module is associated with the activation events of the functional modules to be subsequently executed.

5. The execution environment in accordance with claim 1,
wherein the execution environment for executing the functional modules comprises a plurality of part environments that can be executed separately from one another,
wherein the part environments can be executed on separate execution resources of the controller,
wherein the event chain comprises a first functional module, which is triggered by an initial event of the event chain and which is executed in a first part environment, and a second functional module that is triggered by a temporally following subsequent event of the event chain and that is executed in a second part environment,
wherein the monitoring module comprises a first part module and a second part module,
wherein the first part module is configured to monitor the execution duration in the first part environment, and
wherein the second part module is configured to monitor the execution duration in the second part environment.

6. The execution environment in accordance with claim 5,
wherein the execution environment is configured to transmit a time stamp indicating the start of the monitored execution duration from the first part environment to the second part environment via a communication link.

7. The execution environment in accordance with claim 5,
wherein the execution environment comprises a communication channel between the first and second part environment
wherein the execution environment is configured to communicate, via the communication channel, the exceeding of the predefined time duration determined by the second part module to the first part module.

8. The execution environment in accordance with claim 5,
wherein the execution environment comprises a part environment connected to a plurality of further part environments via communication channels,
wherein the part environment connected to the plurality of further part environments is configured to transmit the exceeding of the predefined time duration, which is received via one of the communication channels, via the remaining communication channels to all of the remaining part environments connected via the communication channels.

9. The execution environment in accordance with claim 1,
wherein the control program comprises at least two event chains that comprise activation events for activating at least one common functional module,
wherein the control program is configured to generate a first activation event of the first event chain and, alternatively or cumulatively, a second activation event of the second event chain after the execution of the common functional module,
wherein the monitoring module is configured to check the execution duration of the functional modules of the first event chain for the exceeding of the predefined time duration,
wherein the monitoring module is configured to check the execution duration of the functional modules of the second event chain for an exceeding of a further predefined time duration or not to perform a check of the execution duration of the functional modules of the second event chain.

10. The execution environment in accordance with claim 1,
wherein the monitoring module is configured to check whether a total time duration predefined for the execution of a plurality of functional modules of the event chain is exceeded.

11. The execution environment in accordance with claim 1,
wherein the monitoring module is configured to monitor execution durations of a plurality of event chains for an exceeding of predefined time durations in each case,
wherein the time durations predefined for the individual event chains are in each case predefined in dependence on initial events triggering the individual event chains.

12. The execution environment in accordance with claim 1,
wherein the monitoring module is configured to check the execution duration, in each case after the execution of the functional modules associated with the individual activation events of the event chain, for the exceeding of the predefined time duration.

13. The execution environment in accordance with claim 1,
wherein the monitoring module is configured to check the execution duration during the execution of the individual functional modules of the event chain for the exceeding of the predefined time duration.

14. A method, implemented by at least one processor in an execution environment system, of executing an event-oriented control program of a programmable logic controller by an execution environment,
wherein the control program comprises program instructions that provide a plurality of functional modules to be successively executed on the programmable logic controller,
wherein the functional modules are executed in an event-driven manner on the occurrence of activation events that are each associated with the individual functional modules,
wherein the method comprises the following steps:
forming an event chain from the activation events of the functional modules to be successively executed;
monitoring, with a monitoring module implemented by program instructions of the execution environment, an execution duration of the functional modules of the event chain on the programmable logic controller; and
checking the execution duration for an exceeding of a predefined time duration,
wherein the monitoring module is formed separately from an execution module implemented by program instructions of the execution environment and executing the individual functional modules of the event chain, and the monitoring module is configured, on the exceeding of the predefined time duration, to trigger an exceeding response.

15. The execution environment in accordance with claim 1,
wherein a last one of the functional modules to be successively executed forms an end module for causing a system response of the execution environment.

16. The execution environment in accordance with claim 3,
wherein the system response comprises an activation of an external output interface of the execution environment.

17. The execution environment in accordance with claim 10,
wherein the monitoring module is configured to check whether a total time duration predefined for the execution of all the functional modules of the event chain is exceeded.

18. The execution environment in accordance with claim 1,
wherein the monitoring module is configured to check whether individual time durations predefined for the execution of individual functional modules of the event chain are exceeded.

19. The execution environment in accordance with claim 1,
wherein the exceeding response comprises an alarm message and/or a control response.

20. A non-transitory computer-readable medium that stores an execution environment, that when executed by at least one processor, causes the at least one processor to perform a method of executing an event-oriented control program of a programmable logic controller,
wherein the control program comprises program instructions that provide a plurality of functional modules to be successively executed on the programmable logic controller,
wherein the functional modules are executed in an event-driven manner on the occurrence of activation events that are each associated with the individual functional modules,
wherein the method comprises the following steps:
forming an event chain from the activation events of the functional modules to be successively executed;
monitoring, with a monitoring module implemented by program instructions of the execution environment, an execution duration of the functional modules of the event chain on the programmable logic controller; and
checking the execution duration for an exceeding of a predefined time duration,
wherein the monitoring module is formed separately from an execution module implemented by program instructions of the execution environment and executing the individual functional modules of the event chain, and the monitoring module is configured, on the exceeding of the predefined time duration, to trigger an exceeding response.

* * * * *